J. R. BOILEAU.
WINDOW.
APPLICATION FILED MAY 15, 1913.

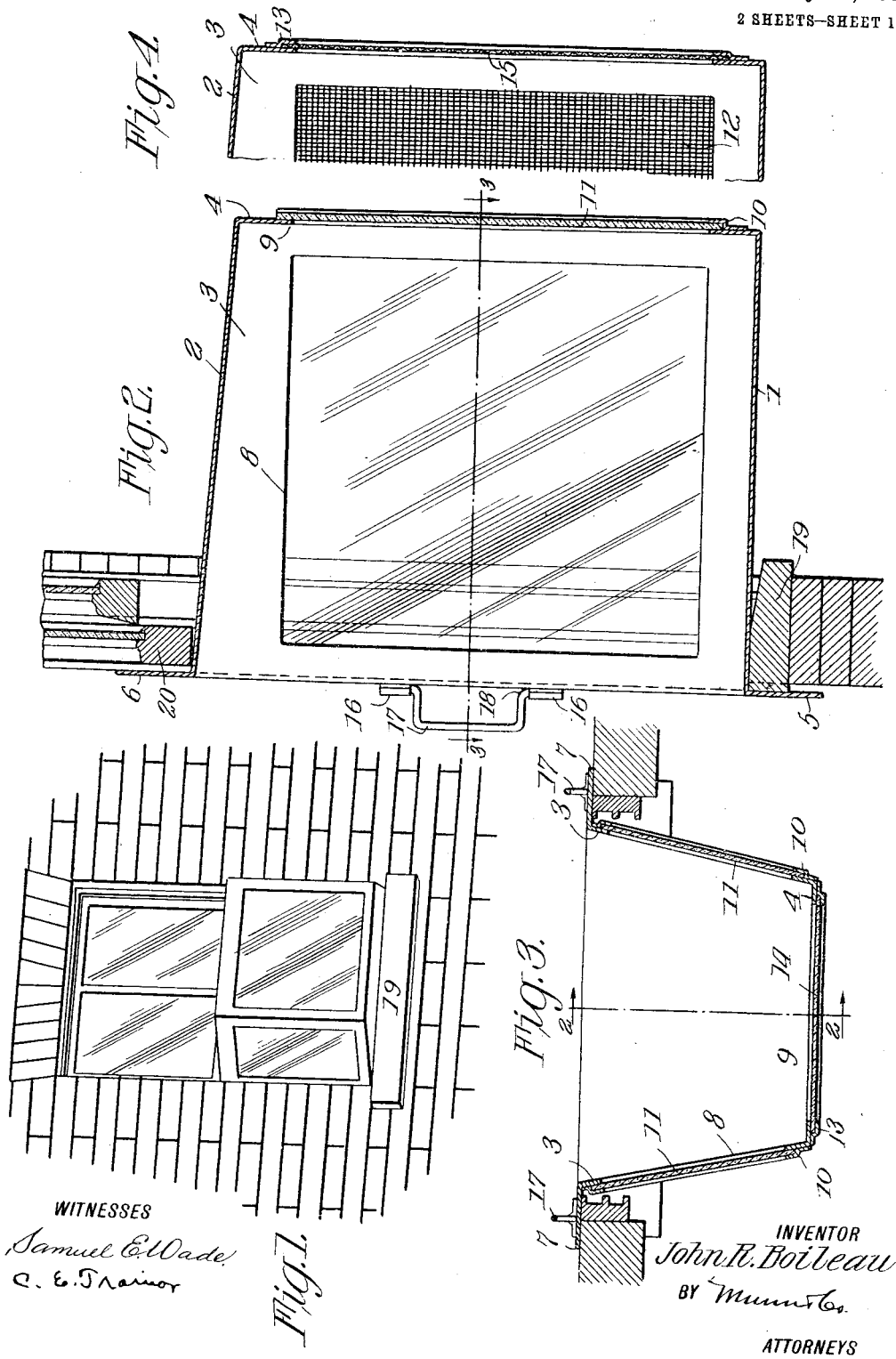

1,098,218.

Patented May 26, 1914.
2 SHEETS—SHEET 2.

WITNESSES
Samuel E. Wade
C. E. Trainor

INVENTOR
John R. Boileau
BY Munn & Co.
ATTORNEYS

UNITED STATES PATENT OFFICE.

JOHN R. BOILEAU, OF MINOCQUA, WISCONSIN.

WINDOW.

1,098,218.

Specification of Letters Patent. Patented May 26, 1914.

Application filed May 15, 1913. Serial No. 767,770.

*To all whom it may concern:*

Be it known that I, JOHN R. BOILEAU, a citizen of the United States, and a resident of Minocqua, in the county of Oneida and State of Wisconsin, have made certain new and useful Improvements in Windows, of which the following is a specification.

My invention is an improvement in windows, and has for its object to provide a means capable of being applied to an ordinary window, for converting the said window into an extension or bow-window, for permitting the occupants of the room to see laterally as well as directly upward, and which may be inclosed by a perforate covering in warm weather, for preventing the entrance of insects, dust and the like, or with an imperforate transparent covering in winter, to prevent the entrance of cold air, while at the same time permitting an unobstructed view.

Figure 5:
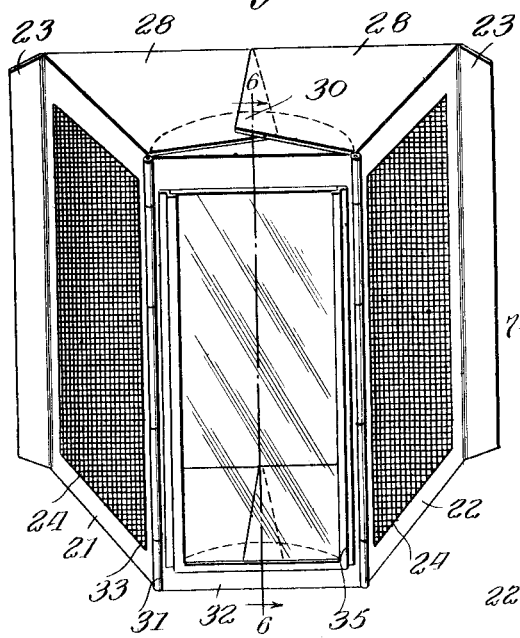
Figure 6:
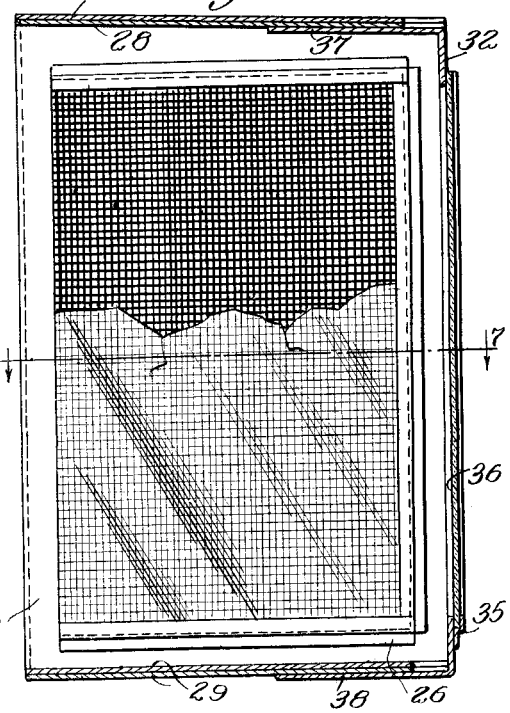
Figure 7:
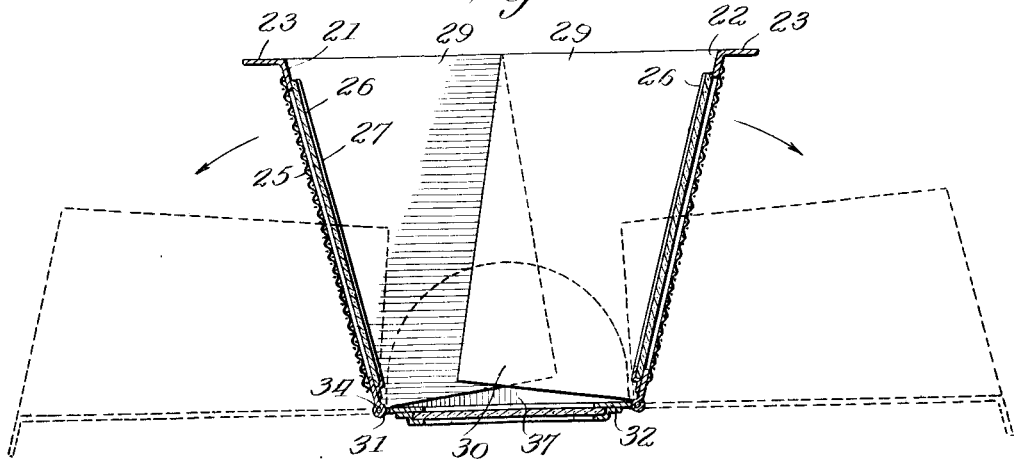

In the drawings: Figure 1 is a perspective view from the outside of the improved window, Fig. 2 is a section on the line 2—2 of Fig. 3, looking in the direction of the arrows, Fig. 3 is a section on the line 3—3 of Fig. 2, looking in the direction of the arrows, Fig. 4 is a view of a portion of Fig. 2, showing a perforate covering, Fig. 5 is a perspective view from in front and above, of a modified construction, and Figs. 6 and 7 are sections on the line 6—6 of Fig. 5 and 7—7 of Fig. 6, respectively, both looking in the direction of the arrows.

In the embodiment of the invention shown in Figs. 1 to 3, the improved window comprises a box-like structure, consisting of a bottom 1, a top 2, sides 3, and a front 4, the said bottom, top, sides and front being of integral construction, and properly shaped, the bottom being plane and horizontal, while the top 2 inclines downwardly toward its outer end and toward the front 4. Both the bottom and the top are provided with the integral laterally extending flanges 5 and 6 respectively, and the sides 3 are provided with similar flanges 7. As shown, the sides 3 and the front 4 are provided with openings 8 and 9 respectively, the said openings extending over the greater portion of the area of the said sides and front. The sides 3 are provided with guideways 10 on their outer faces encircling the openings 8, for receiving sheets 11 of transparent imperforate material, as for instance glass, or for receiving sheets 12 of perforate material, as for instance wire screen, as shown in Fig. 4. The front 4 of the window is also provided with guideways 13 encircling the opening 9, for receiving sheets 14 of imperforate transparent material, or for receiving sheets 15 of perforate material, as may be desired. The guideways 10 or 13 may be omitted at one side of each opening, as shown at the top of the front 4 in Fig. 2, to permit the insertion and removal of the sheets 11 or 15. Each of the flanges 7 of the sides 3 is provided with alined vertical spaced bearings 16, and a handle 17 is connected with each pair of bearings, each of the said handles being in the form of a bail having lateral lugs 18 for engaging the bearings. The said lugs 18 are offset laterally from the handle portion or body of the bail, and the said bails may be turned into the position of Figs. 2 and 3 or flat on the flanges. The imperforate top 2 is as before stated inclined toward the front 4 so that rain, and the like, will not stand on the top, but will flow toward the front. The sides 3 are also inclined, converging slightly toward the front 4, as shown more particularly in Fig. 3. The improved window is placed in the position shown in Figs. 2 and 3, the bottom 1 resting on the sill 19 of the window, and the bottom rail 20 of the lower sash resting upon the top 2. The flanges 5, 6 and 7 are engaged with the inner faces of the casing of the window, the flange 5 fitting against the inner face of the sill, while the flange 6 extends across between the said members of the casing. The flanges 7 are engaged with the inner face of the said members, as shown in Fig. 3.

When it is desired to remove the extension or bow-window, the bails 17 are grasped, and the extension window is moved inwardly. In summer the perforate coverings 12 and 13 are arranged in the openings of the sides and front, while in winter the transparent imperforate sheets 11 are made use of. The improved window may be utilized as a conservatory for plants, to expose the same to the sun, and with the perforate coverings in place, the plants are also exposed to the air. For conservatory use, the top 2 may also be provided with an opening covered with imperforate transparent material, or perforate material as may be desired. The bottom 1 may also be formed with an opening similarly covered.

The device is especially adapted for upstairs dwellers, as for instance in apartment houses and the like, and may be used as a ventilating device, or as a storm window. In the construction of Figs. 1 to 3, and Fig. 4, the extension windows are made in sizes to fit the windows in which they are to be used, the said extension windows being of a width at their open sides corresponding to the width of the casement, and of a height corresponding to the height of the lower sash. The extension window is easily handled by means of the bails.

In the construction of Figs. 5, 6 and 7, the improved window is composed of a sectional top and a sectional bottom. In the said construction sides 21 and 22 are provided, each having a lateral flange 23, and each of the said sides is provided with an opening 24. A sheet 25 of perforate material is arranged on the outer face of each of the said sides at the opening, and a guideway 26 is arranged on the inner face of each of the said sides, each of the guideways encircling three sides of the opening. As shown, the inner side of the opening is free, so that a sheet 27 of imperforate transparent material, as for instance glass, may be inserted in the guideways. Each side is thus provided with a perforate and an imperforate transparent covering. Each of the sides 21 and 22 is also provided at each of its ends with a lateral extension 28 and 29. The said extensions are of an aggregate width equal to the width of the casement in which the extension window is to be used, and at their outer ends the said flanges overlap, as indicated at 30 in Figs. 5 and 7. At its outer edge, each of the sides 21 and 22 is provided with a plurality of bearings 31, and an open frame 32 is arranged between the outer ends of the said sides and between the extensions 28 and 29. The said frame 32 is provided with bearings 33 at each of its side edges, the said bearings fitting between the bearings 31 of the sides, and rods 34 are passed through the alined bearings for hinging the frame 32 to the sides. The said frame 32 is provided with guideways 35 extending on each side and along the bottom of the opening of the frame, and on the outer face thereof, for receiving a sheet 36 of transparent imperforate material. At each end the frame 32 is provided with an inwardly extending approximately semi-circular flange or extension 37 and 38 respectively. The flange 37 extends below the overlapping extensions 28, and the flange 38 extends below the overlapping extensions 29, and both of the flanges 37 and 38 lap upon the adjacent extensions to cover and make a tight top and bottom for the extension window. The device just described is used in precisely the same manner as the construction of Figs. 1 to 3, and the said device is capable of adjustment to fit windows of various sizes.

I claim:—

An extension or bow-window comprising side frames and a front frame, a hinge connection between each side edge of the front frame and the adjacent side edge of the adjacent side frame, the side frames having inwardly extending lateral extensions at their upper and lower ends, said extensions being adapted to lap upon each other, the front frame having at each end a lateral inwardly extending flange adapted to underlie the extensions of the sides.

JOHN R. BOILEAU.

Witnesses:
H. T. AMES,
THEO. BOSACKI.

Copies of this patent may be obtained for five cents each, by addressing the "Commissioner of Patents, Washington, D. C."